US010326182B2

(12) United States Patent
Heulens et al.

(10) Patent No.: US 10,326,182 B2
(45) Date of Patent: Jun. 18, 2019

(54) PROCESS FOR SMELTING LITHIUM-ION BATTERIES

(71) Applicant: Umicore, Brussels (BE)

(72) Inventors: Jeroen Heulens, Kerkom (BE); David Van Horebeek, Tielt-Winge (BE); Maarten Quix, Hoboken (BE); Sybolt Brouwer, Berchem (BE)

(73) Assignee: UMICORE, Brussels (BE)

( * ) Notice: Subject to any disclaimer, the term of this patent is extended or adjusted under 35 U.S.C. 154(b) by 26 days.

(21) Appl. No.: 15/503,416

(22) PCT Filed: Aug. 3, 2015

(86) PCT No.: PCT/EP2015/067809
§ 371 (c)(1),
(2) Date: Feb. 13, 2017

(87) PCT Pub. No.: WO2016/023778
PCT Pub. Date: Feb. 18, 2016

(65) Prior Publication Data
US 2017/0229744 A1    Aug. 10, 2017

(30) Foreign Application Priority Data

Aug. 14, 2014  (EP) .................................... 14181054

(51) Int. Cl.
| | |
|---|---|
| *C22B 4/00* | (2006.01) |
| *C22B 7/00* | (2006.01) |
| *C22B 9/22* | (2006.01) |
| *C22B 23/02* | (2006.01) |
| *C22B 26/12* | (2006.01) |
| *H01M 10/54* | (2006.01) |

(52) U.S. Cl.
CPC ............. *H01M 10/54* (2013.01); *C22B 4/005* (2013.01); *C22B 7/001* (2013.01); *C22B 7/004* (2013.01); *C22B 9/226* (2013.01); *C22B 23/02* (2013.01); *C22B 26/12* (2013.01); *Y02P 10/214* (2015.11); *Y02P 10/224* (2015.11); *Y02W 30/84* (2015.05)

(58) Field of Classification Search
CPC ......... C22B 4/005; C22B 7/004; C22B 7/001; C22B 9/226; C22B 23/02; C22B 26/12; Y02W 30/84; Y02P 10/224; H01M 10/54
See application file for complete search history.

(56) References Cited

U.S. PATENT DOCUMENTS

| | | | | |
|---|---|---|---|---|
| 2,960,594 | A  * | 11/1960 | Thorpe | .................... H05H 1/34 |
| | | | | 219/121.48 |
| 4,486,229 | A | 12/1984 | Troup | |
| 2005/0235775 | A1* | 10/2005 | Cheret | .................... C22B 7/003 |
| | | | | 75/10.19 |
| 2007/0095169 | A1 | 5/2007 | Van Camp | |
| 2010/0050814 | A1 | 3/2010 | Van Camp | |
| 2012/0240729 | A1* | 9/2012 | Verscheure | ............... C22B 5/04 |
| | | | | 75/626 |

FOREIGN PATENT DOCUMENTS

| | | |
|---|---|---|
| CN | 1186522 A | 7/1998 |
| CN | 100475987 C | 4/2009 |
| CN | 101827951 A | 9/2010 |
| WO | WO2013088137 A1 | 6/2013 |

OTHER PUBLICATIONS

International search report for PCT/EP2015/067809, dated Oct. 23, 2015.
Jones, R.T., et al. "Recovery of cobalt from slag in a DC arc furnace at Chambishi, Zambia", The Journal of the South African Institute of Mining and Metalurgy, (Jan./Feb. 2002), pp. 5-9.

* cited by examiner

*Primary Examiner* — Tima M McGuthry-Banks
(74) *Attorney, Agent, or Firm* — NK Patent Law

(57) ABSTRACT

The invention concerns a process for the separation of cobalt from lithium present in a charge comprising lithium-ion batteries or related products, comprising the steps of: smelting the charge using a bath furnace equipped with a submerged air-fed plasma torch for injecting plasma gas into the melt; defining and maintaining a bath redox potential where cobalt is reduced to the metallic state and reporting to an alloy phase, and whereby lithium is oxidized as $Li_2O$ and reporting to the slag phase; decanting and separating the phases. It is characterized in that the reduction and oxidizing steps are performed simultaneously. A suitably low cobalt concentration is obtained in the slag.

7 Claims, No Drawings

PROCESS FOR SMELTING LITHIUM-ION BATTERIES

This application is a National Stage application of International Application No. PCT/EP2015/067809, filed Aug. 3, 2015. This application also claims priority under 35 U.S.C. § 119 to European Application No. 14181054.9, filed Aug. 14, 2014.

The present disclosure relates to a smelting process for the separation and recovery of metals, which is especially suitable for treating cobalt-bearing lithium-ion batteries or related products.

Lithium-ion batteries contain a variable amount of transition metals where under, typically, cobalt. Nickel and manganese may also be present, as in so-called NMC batteries. All these elements are normally part of more complex compounds and are in an oxidized, i.e. non-metallic, form.

Lithium-ion batteries further contain appreciable amounts of metallic aluminum and elemental carbon. These are primarily present in the foil supporting the active cathode material, and in the anode. Some metallic copper may be present in foils and in the electrical connections; iron is often found in the casing or in the supporting structure of battery packs.

Bath smelting as a separation process implies the use of slag formers so as to generate two liquid phases: a metallic alloy phase concentrating elements prone to undergo reduction, and a slag phase concentrating elements prone to oxidation. A target redox potential is to be defined, which needs to be reached and maintained during the process by addition of measured amounts of oxygen. This will determine the distribution of the elements amongst the phases. The aluminum and carbon contained in the batteries act as reducing agents and/or as fuel when reacting with oxygen.

Specially prepared charges, based on particularly aluminum- and carbon-rich lithium-ion batteries may allow for autogeneous reducing smelting using oxygen only. A process using oxygen without neither additional fuel nor any other reducing agent is described in WO2011035915. Deep reduction levels cannot be reached as the elemental carbon has to be burned with an excess of oxygen to ensure a sufficient heat yield.

Most lithium-ion bearing charges do not allow for an autogeneous smelting. Some external source of calories is then required to melt the charge and to compensate for the heat losses of the furnace. Direct heating of the metallurgical charge using an oxygen-fuel burner is commonly preferred to indirect heating schemes. Even then, deep reduction levels cannot be reached.

Deep reduction, e.g. corresponding to a partial oxygen pressure ($PO_2$) of $10^{-14}$ atm or less, is needed to achieve a clean, cobalt-free slag. This implies a $CO_2/(CO++CO_2)$ ratio of less than 0.0006 at the operating temperature of about 1500° C.; under such conditions, a fuel burner does not transfer much energy to the bath, while huge amounts of CO are being generated. Although some energy can be recovered in a post-combustion reactor, this increases the capital expenditure and the complexity of the installation.

Consequently, residual cobalt concentrations of more than 1% in the slag are fairly typical in smelting operations. While this level is acceptable in some niche applications such as for colored glass or ceramic, cobalt in the slag is generally undesired. Its presence indeed precludes the use of the slag in most building applications, where the risk of cobalt leaching to the environment cannot be borne.

A separate slag cleaning process is therefore sometimes applied, subjecting the slag to deep reduction using an arc furnace under addition of carbon. Such a process is described in "Recovery of cobalt from slag in a DC arc furnace at Chambishi, Zambia", R T Jones et al., Copper Cobalt Nickel and Zinc Recovery conference, Victoria Falls, Zimbabwe, 16-18 Jul. 2001. But a separate slag-cleaning process again increases the capital expenditure and the complexity.

It is the purpose of the present disclosure to define an integrated smelting and deep reduction process achieving a residual cobalt concentrations in the slag of preferably below 0.1%.

Accordingly, a submerged non-transferred air-fed plasma torch is used to bring in the necessary heat directly into the molten bath, while adding a minimum of oxidizing agents. In this way, the reducing agents that are inherently present in the lithium-batteries are preserved from oxidation by excess oxygen. These agents thus remain available for the reduction of cobalt, which is therefore quantitatively transferred to the metallic alloy phase. The heat brought in by the plasma gas ensures proper melting and fluidity conditions for both the metallic phase and the slag phase.

Using this technique, intensive mixing of the phases occurs during plasma blowing. This certainly accelerates the transport phenomena, but it also forces the inclusion of a settling or decantation step before the phases are tapped.

The invention in particular concerns a process for the separation of cobalt from lithium present in a charge comprising lithium-ion batteries. This charge may comprise related products, e.g. production scrap of such batteries, end of life lithium-ion batteries or corresponding battery scrap. Charges with lithium-ion batteries normally also contain metallic aluminum and elemental carbon. The process comprises the steps of smelting the charge using a bath furnace equipped with a submerged plasma torch for injecting an oxygen-bearing plasma gas into the melt; reducing cobalt to the metallic state, thereby collecting it in an alloy phase; oxidizing the lithium, thereby collecting it in a slag phase; and, decanting and separating the phases. It is characterized in that the reduction and oxidizing steps are performed simultaneously.

By submerged plasma torch is meant a non-transferred plasma generator located below the surface of the molten bath on the outside of the furnace. It is indicated to locate the plasma torch close to the gas injection point, e.g. against a side-wall, and to use a short tube or tuyere through the side wall to inject the plasma gas. The submerged plasma torch is preferably fed with air.

The process is preferably run in a furnace additionally equipped with a submerged injector for injecting an $O_2$-bearing gas into the melt. This allows for a supplemental degree of freedom to control the redox potential in the furnace, in particular when the oxygen contained in the plasma gas is not sufficient to reach a suitable partial pressure. This could occur when e.g. aluminum-rich batteries are treated. This injector can be a separate constituent, like a tube or tuyere, blowing directly into the bath, or it can be integrated in the submerged air-fed plasma torch or its tuyere, e.g. for blowing sheath gas. The oxygen-bearing gas can be air, enriched air or pure $O_2$. Both the plasma gas and the optional oxygen-bearing gas are preferably injected directly into the slag phase.

The above process is preferably run at a target oxygen pressure between $10^{-18}$ and $10^{-14}$ atm, a condition that can be maintained by adjusting the oxygen input to the bath. The upper bound precludes the formation of cobalt oxides and its loss in the slag. The lower bound ensures that elements such as aluminum and carbon are oxidized, thereby significantly participating in the production of heat.

The process is preferably run at a bath temperature between 1450 and 1650° C., a condition that can be maintained by adjusting the electric power to the plasma torch. The heat balance cannot generally be fulfilled by oxidation of elements present in the useful metallurgical charge (i.e. excluding additions such as fluxes, reducing agents and fuel). Additional heat has then to be delivered. As explained above, adding classical reducing agents or fuel together with oxygen is not particularly effective in the strongly reducing conditions needed to keep the cobalt out of the slag. However, it has been found that an electric plasma generator, even when fed with an oxygen-bearing gas such as air, is suitable. Indeed, the amount of oxygen introduced with the plasma air remains at or below the upper limit consistent with the targeted $PO_2$.

The above process is particularly suitable for treating relatively concentrated lithium-ion battery charges wherein the lithium-ion batteries or their scrap represent more than 80% of the net metallurgical charge, fluxes, reducing agents and fuel excluded.

Another embodiment of the invention concerns a bath furnace for performing the above-described process. Such a furnace is susceptible to contain a molten bath up to a defined level, is equipped with an air-fed plasma torch for injecting plasma gas into the melt through a first injection point, and with an injector for injecting oxygen-bearing gas into the melt through a second injection point, both injection points being located below said defined level.

The desired oxidation level is defined by the $PO_2$. This quantity can be determined by analyzing the gasses directly above the molten bath; this measurement is however prone to sampling errors. The $PO_2$ can also be derived from the distribution of metals between slag and in the alloy. As cobalt is the most relevant element with respect to the disclosed process, one usefully relies on the reaction:

$Co_{(alloy)} + 0.5\ O_{2(g)} \rightarrow CoO_{(slag)}$, defining the equilibrium constant

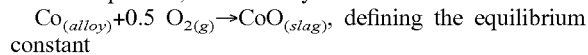

According to thermodynamic data, this constant amounts to 1681 at the typical working temperature of 1500° C. When aiming for a 0.1% CoO in the slag, and assuming 40% Co in the alloy, a $PO_2$ of $2.10^{-12}$ atm can be derived. Taking activities instead of concentrations into account, and providing for some industrial margin, an upper bound of $10^{-14}$ atm is to be pursued.

The lower bound of $10^{-18}$ atm is dictated by the wish to oxidize elements such as carbon, aluminum and lithium so as to recover them in the slag.

EXAMPLE

The invention is illustrated with the following example. The apparatus comprises a bath furnace equipped with a submerged electric plasma torch for injecting hot gases, and with a submerged nozzle for injecting pure oxygen-bearing.

Spent portable rechargeable Li-ion batteries (PRB) are fed to the top of the melt at a rate of 1 ton/h. Together with the batteries, fluxes are needed to maintain the slag liquid even though the aluminum from the batteries is being slagged as $Al_2O_3$. To this end, 150 kg/h sand and 300 kg/h limestone are added, corresponding to a suitable CaO to $SiO_2$ ratio of about 1. Since the reduction of cobalt to sub-percentage levels in the slag requires a very low oxygen partial pressure of about $10^{-14}$ atm, only a limited amount of oxygen can be injected. We have observed that for this particular lot, 235 $Nm^3$ $O_2$ per ton batteries fulfills this $PO_2$ criterion. Since the heat balance of the furnace is negative at 1 ton/h PRB and 235 $Nm^3/h$, an additional energy source is required. Therefore, a submerged electric plasma torch is operated at 500 $Nm^3/h$ air as plasma gas, generating about 1.3 MW of net enthalpy. A separate tuyère provides 130 $Nm^3/h$ oxygen into the bath, which, added to the oxygen in the plasma gas adds up to the required total of 235 $Nm^3/h$. The temperature of the bath is controlled between 1450 to 1650° C. by adjusting the electric power of the plasma torch. At regular intervals, the alloy and slag are tapped after a decanting step of about 5 minutes.

Table 1 shows the material balance of the process. A suitably low cobalt concentration is obtained in the slag while lithium and aluminum are completely oxidized and slagged.

TABLE 1

| | Input and output phases of the process on an hourly basis | | | | | | | |
|---|---|---|---|---|---|---|---|---|
| | Mass (kg) | Cu (%) | Ni (%) | Fe (%) | Co (%) | $Al_2O_3$ (%) | $SiO_2$ (%) | CaO (%) |
| Input | | | | | | | | |
| Batteries | 1000 | 8 | 4 | 11 | 12 | 9 | | |
| Sand | 150 | | | | | | 100 | |
| Limestone | 300 | | | | | | | 56 |
| Output | | | | | | | | |
| Alloy | 364 | 22 | 11 | 28 | 33 | | | |
| Slag | 586 | <0.05 | <0.05 | 0.9 | <0.05 | 29 | 30 | 28 |

The invention claimed is:

1. A process for separating cobalt from lithium present in a charge comprising lithium-ion batteries or battery scrap, comprising:
   smelting the charge using a bath furnace comprising a submerged plasma torch for injecting an oxygen-bearing plasma gas into the melt;
   defining and maintaining a bath oxygen partial pressure whereby cobalt is reduced to the metallic state and reporting to an alloy phase, and whereby lithium is oxidized and reporting to a slag phase; and
   decanting and separating the alloy phase and the slag phase;
   wherein the reduction and oxidizing steps are performed simultaneously.

2. The process according to claim 1, wherein said bath furnace further comprises a submerged injector for injecting an O2-bearing gas into the melt.

3. The process according to claim 1, further comprising adjusting electric power to the plasma torch to maintain a target bath temperature of between 1450 and 1650° C.

4. The process according to claim 1, further comprising adjusting oxygen input to the melt to maintain a target bath oxygen partial pressure between 10-18 and 10-14 atm.

5. The process according to claim 1, wherein the lithium-ion batteries or their scrap represent more than 80% of the total metallurgical charge, slag formers excluded.

6. The process according to claim 1, wherein a residual cobalt concentration in the slag phase is less than approximately 0.1% of a total mass of the slag phase.

7. The process according to claim 1, wherein injecting the oxygen-bearing plasma gas into the melt comprises supplying heat through the oxygen-bearing plasma gas.

* * * * *